United States Patent

Kim et al.

(10) Patent No.: US 10,844,194 B2
(45) Date of Patent: Nov. 24, 2020

(54) PLASTICIZER COMPOSITION AND RESIN COMPOSITION INCLUDING SAME

(71) Applicant: LG CHEM, LTD., Seoul (KR)

(72) Inventors: Hyun Kyu Kim, Daejeon (KR); Yun Ki Cho, Daejeon (KR); Jeong Ju Moon, Daejeon (KR); Mi Yeon Lee, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 73 days.

(21) Appl. No.: 16/318,322

(22) PCT Filed: Dec. 11, 2017

(86) PCT No.: PCT/KR2017/014488
§ 371 (c)(1),
(2) Date: Jan. 16, 2019

(87) PCT Pub. No.: WO2018/110923
PCT Pub. Date: Jun. 21, 2018

(65) Prior Publication Data
US 2019/0248984 A1 Aug. 15, 2019

(30) Foreign Application Priority Data

Dec. 12, 2016 (KR) .................... 10-2016-0168321

(51) Int. Cl.
| | |
|---|---|
| *C08K 5/1515* | (2006.01) |
| *C08K 5/12* | (2006.01) |
| *C08L 27/06* | (2006.01) |
| *C08L 23/06* | (2006.01) |
| *C08L 23/12* | (2006.01) |
| *C08L 25/06* | (2006.01) |
| *C08K 5/00* | (2006.01) |
| *C08L 91/00* | (2006.01) |
| *C08L 23/08* | (2006.01) |
| *C08F 14/06* | (2006.01) |
| *C08J 3/22* | (2006.01) |

(52) U.S. Cl.
CPC ............ *C08K 5/1515* (2013.01); *C08F 14/06* (2013.01); *C08J 3/226* (2013.01); *C08K 5/00* (2013.01); *C08K 5/0016* (2013.01); *C08K 5/12* (2013.01); *C08L 23/06* (2013.01); *C08L 23/0853* (2013.01); *C08L 23/12* (2013.01); *C08L 25/06* (2013.01); *C08L 27/06* (2013.01); *C08L 91/00* (2013.01); *C08K 2201/014* (2013.01); *C08L 2207/32* (2013.01)

(58) Field of Classification Search
CPC .. C08K 5/1515; C08K 5/12; C08K 2201/014; C08J 3/226; C08L 2207/32; C08L 27/06; C08F 14/06

USPC ........................................................ 524/114
See application file for complete search history.

(56) References Cited

U.S. PATENT DOCUMENTS

| | | | |
|---|---|---|---|
| 7,208,545 | B1 | 4/2007 | Brunner et al. |
| 7,973,194 | B1 | 7/2011 | Kinkade et al. |
| 10,030,120 | B2 | 7/2018 | Wagner et al. |
| 2013/0317152 | A1 | 11/2013 | Becker et al. |
| 2014/0309345 | A1 | 10/2014 | Frenkel et al. |
| 2015/0368431 | A1* | 12/2015 | Ghosh-Dastidar ... C08K 5/0016 428/375 |
| 2016/0017259 | A1 | 1/2016 | Woldt et al. |
| 2016/0060426 | A1 | 3/2016 | Woldt et al. |
| 2016/0237244 | A1 | 8/2016 | Boeck et al. |
| 2016/0312004 | A1 | 10/2016 | Wagner et al. |
| 2017/0313850 | A1 | 11/2017 | Pfeiffer et al. |

FOREIGN PATENT DOCUMENTS

| | | |
|---|---|---|
| CN | 102212189 A | 10/2011 |
| CN | 103313847 A | 9/2013 |
| CN | 105793341 A | 7/2016 |
| EP | 2810982 * | 12/2014 |
| EP | 2990470 A1 | 3/2016 |
| JP | 5135177 B2 | 1/2013 |
| KR | 20090038514 A * | 4/2009 |
| KR | 1020140116371 A | 10/2014 |
| KR | 1020150126930 A | 11/2015 |
| KR | 1020150131016 A | 11/2015 |
| KR | 10-2016-0101880 A | 8/2016 |
| WO | 2011115757 A | 9/2011 |
| WO | 2014195056 A | 12/2014 |
| WO | 2014195056 A1 | 12/2014 |
| WO | 2016055573 A | 4/2016 |

OTHER PUBLICATIONS

Translation of KR 20090038514, Apr. 21, 2009. (Year: 2009).*
J. F. Rusling et al: "Epoxidation of Alkyl Esters of 12,13-Epoxyoleic Acids and Evaluation of the Diepoxides as Plasticizers for Poly(vinyl Chloride)", Journal of the American Oil Chemists Society (JAOCS), vol. 45, No. 11, Nov. 1, 1968 (Nov. 1, 1968), pp. 760-763, XP055586081.

* cited by examiner

*Primary Examiner* — Hui H Chin
(74) *Attorney, Agent, or Firm* — Dentons US LLP

(57) ABSTRACT

The present invention relates to a plasticizer composition, a resin composition including the same, and a method of preparing the same. The plasticizer composition includes a cyclohexane 1,4-diester-based material; and an epoxidized alkyl ester-based material, wherein a weight ratio of the cyclohexane 1,4-diester-based material and the epoxidized alkyl ester-based material is 99:1 to 1:99, and the epoxidized alkyl ester-based material has an oxirane index (O.I.) of 1.5 or more. When the plasticizer composition is used as a plasticizer for a resin composition, properties such as plasticization efficiency, migration ability, tensile strength, elongation rate, migration upon stress, absorption rate, and the like may be improved.

12 Claims, No Drawings

PLASTICIZER COMPOSITION AND RESIN COMPOSITION INCLUDING SAME

CROSS-REFERENCE TO RELATED APPLICATION

This application is a National Stage Application of International Application No. PCT/KR2017/014488 filed on Dec. 11, 2017, which claims priority to and the benefit of Korean Patent Application No. 10-2016-0168321, filed on Dec. 12, 2016, the disclosure of which is incorporated herein by reference in its entirety.

TECHNICAL FIELD

The present invention relates to a plasticizer composition and a resin composition including the same.

BACKGROUND ART

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, trimellitate-, and other polymer-based plasticizers.

Generally, a plasticizer is used as a material for various products such as electric wires, pipes, flooring materials, wallpaper, sheets, artificial leather, tarpaulins, tape and food wrapping materials obtained in the related industries according to a processing method such as extrusion molding, injection molding or calendering after suitably adding resins such as polyvinyl chloride (PVC) and the like and various additives such as fillers, stabilizers, pigments, anti-fogging agents, and the like to provide various processing properties.

In the current plasticizer market, environmentally-friendly plasticizers are competitively developing in the related field due to environmental issues of phthalate plasticizers, and recently, new products for overcoming the inferiority of di(2-ethylhexyl) terephthalate (DEHTP), which are being used as general purpose products among environmentally-friendly plasticizers, in qualities such as plasticization efficiency, migration ability, and the like have been developed.

Accordingly, there is a need to develop a novel composition product including a product which has properties superior to those of DEHTP, and continuously conduct research on the most suitable technology for the use thereof as a plasticizer for vinyl chloride-based resins.

DISCLOSURE

Technical Problem

Therefore, during research on plasticizers, the present inventors verified a plasticizer composition capable of improving the properties of a vinyl chloride-based resin composition, and thus completed the present invention.

That is, the present invention is directed to providing a plasticizer composition capable of improving properties such as hardness, tensile and elongation retention, migration resistance, volatile loss, and the like when used as a plasticizer for a resin composition, a method of preparing the same, and a resin composition including the same.

Technical Solution

According to an embodiment of the present invention, there is provided a plasticizer composition which includes a cyclohexane 1,4-diester-based material including one or more compounds represented by Chemical Formula 1 below; and an epoxidized alkyl ester-based material including one or more compounds represented by Chemical Formula 2 below, wherein a weight ratio of the cyclohexane 1,4-diester-based material and the epoxidized alkyl ester-based material is 99:1 to 1:99, and the epoxidized alkyl ester-based material has an oxirane index (O.I.) of 1.5 or more.

[Chemical Formula 1]

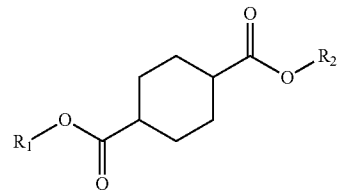

In Chemical Formula 1, $R_1$ and $R_2$ each independently are the same or different, and are C4 to C10 alkyl groups.

[Chemical Formula 2]

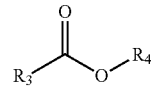

In Chemical Formula 2, $R_3$ is a C8 to C20 alkyl group containing one or more epoxy groups, and $R_4$ is a C4 to C10 alkyl group.

According to another embodiment of the present invention, there is provided a resin composition which includes 100 parts by weight of a resin; and 5 to 150 parts by weight of the above-described plasticizer composition.

Advantageous Effects

A plasticizer composition according to an embodiment of the present invention can exhibit excellent plasticization efficiency, can improve properties such as tensile strength, elongation rate, migration resistance, volatile resistance, and the like, and can also improve processability due to an appropriate absorption rate when used for a resin composition.

MODE FOR INVENTION

Hereinafter, the present invention will be described in further detail to help in understanding the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The names of compounds used in this specification may be generic names and are named according to the substituents which are characteristically bonded to each compound.

Even though the name of the compound does not correspond to the generic name, it can be understood that it is named according to the substituent represented in the structure of the chemical formula.

The term "alkyl group" used herein can be understood to be linear or branched without other limitations other than a limitation in carbon number unless specifically mentioned otherwise.

According to an embodiment of the present invention, there is provided a plasticizer composition which includes one or more cyclohexane 1,4-diester-based materials; and one or more epoxidized alkyl ester-based materials.

The cyclohexane 1,4-diester-based material may be a compound represented by Chemical Formula 1 below.

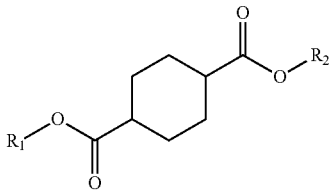

[Chemical Formula 1]

In Chemical Formula 1, $R_1$ and $R_2$ may be the same or different, and each independently may be selected from C4 to C12 alkyl groups.

In this specification, when components of the cyclohexane 1,4-diester-based material, for example, $R_1$ and $R_2$ are the same, the cyclohexane 1,4-diester-based material may be named dialkyl cyclohexane-1,4-diester, and when $R_1$ and $R_2$ are different from each other, the cyclohexane 1,4-diester-based material may be named alkyl ($R_1$) alkyl ($R_2$) cyclohexane-1,4-diester.

$R_1$ and $R_2$ in Chemical Formula 1 each independently may be selected from the group consisting of a butyl group, an isobutyl group, a pentyl group, a hexyl group, a heptyl group, a 2-ethylhexyl group, an octyl group, a nonyl group, an isononyl group, a 2-propylheptyl group, a decyl group, and an isodecyl group, and may be the same or different.

Specifically, when the cyclohexane 1,4-diester-based material is a single compound including one type of a compound, $R_1$ and $R_2$ in Chemical Formula 1 may be the same. In this case, the cyclohexane 1,4-diester-based material may be dibutyl cyclohexane-1,4-diester (1,4-DBCH), diisononyl cyclohexane-1,4-diester (1,4-DINCH), di(2-ethylhexyl) cyclohexane-1,4-diester (1,4-DEHCH), di(2-propylheptyl) cyclohexane-1,4-diester(1,4-DPHCH), or the like.

When the cyclohexane 1,4-diester-based material is a mixture including three types of compounds, the mixture may essentially include one type of a compound having $R_1$ and $R_2$ different from each other.

Specifically, examples of the cyclohexane 1,4-diester having $R_1$ and $R_2$ different from each other essentially included in the mixture include butyl (2-ethylhexyl) cyclohexane-1,4-diester (1,4-BEHCH), (2-ethylhexyl) isononyl cyclohexane-1,4-diester (1,4-EINCH), butyl isononyl cyclohexane-1,4-diester (1,4-BINCH), (2-ethylhexyl) (2-propylheptyl) cyclohexane-1,4-diester (1,4-EPHCH), (2-propylheptyl) isononyl cyclohexane-1,4-diester (1,4-PINCH), butyl (2-propylheptyl) cyclohexane-1,4-diester (1,4-BPHCH), and the like.

In addition, when the cyclohexane 1,4-diester-based material is a mixture, the mixture may be prepared by mixing three types of cyclohexane 1,4-diesters. Examples thereof include a first mixture of di(2-ethylhexyl) cyclohexane-1,4-diester, butyl (2-ethylhexyl) cyclohexane-1,4-diester, and dibutyl cyclohexane-1,4-diester, a second mixture of diisononyl cyclohexane-1,4-diester, butyl isononyl cyclohexane-1,4-diester, and dibutyl cyclohexane-1,4-diester, a third mixture of di(2-ethylhexyl) cyclohexane-1,4-diester, (2-ethylhexyl) isononyl cyclohexane-1,4-diester, and diisononyl cyclohexane-1,4-diester, and the like. The mixture may have a mixing composition essentially including the aforementioned cyclohexane 1,4-diester compound having two mutually different alkyl groups.

Specifically, a cyclohexane 1,4-diester-based material including three types of cyclohexane 1,4-diesters, such as the first to third mixtures, may have a specific composition ratio. The first mixture may include di(2-ethylhexyl) cyclohexane-1,4-diester, butyl (2-ethylhexyl) cyclohexane-1,4-diester, and dibutyl cyclohexane-1,4-diester at 3.0 to 99.0 mol %, 0.5 to 96.5 mol %, and 0.5 to 96.5 mol %, respectively; the second mixture may include diisononyl cyclohexane-1,4-diester, butyl isononyl cyclohexane-1,4-diester, and dibutyl cyclohexane-1,4-diester at 3.0 to 99.0 mol %, 0.5 to 96.5 mol %, and 0.5 to 96.5 mol %, respectively; the third mixture may include di(2-ethylhexyl) cyclohexane-1,4-diester, (2-ethylhexyl) isononyl cyclohexane-1,4-diester, and diisononyl cyclohexane-1,4-diester at 3.0 to 99.0 mol %, 0.5 to 96.5 mol %, and 0.5 to 96.5 mol %, respectively.

The composition ratio may be a mixing composition ratio produced by esterification or a composition ratio achieved by additionally mixing a specific compound, and the mixing composition ratio may be appropriately adjusted to achieve a desired property.

In addition, when a cyclohexane 1,4-diester-based material is a mixture of three types of cyclohexane 1,4-diesters, it essentially includes a "hybrid-type" cyclohexane 1,4-diester-based material having $R_1$ and $R_2$ different from each other in Chemical Formula 1 unlike when the cyclohexane 1,4-diester-based material is a single compound. Therefore, the properties may be more easily complemented, and the desired property may be easily achieved.

The plasticizer composition according to an embodiment of the present invention includes a plasticizer composition including an epoxidized alkyl ester-based material.

The epoxidized alkyl ester-based material may be represented by Chemical Formula 2 below.

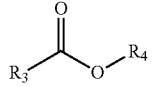

[Chemical Formula 2]

In Chemical Formula 2, $R_3$ is a C8 to C20 alkyl group containing one or more epoxy groups, and $R_4$ is a C4 to C10 alkyl group.

The epoxidized alkyl ester-based composition may have an oxirane content (O.C.) of 3.5% or more, 4.0% or more, or 4.2% or more, and preferably 4.5% or more. Also, the epoxidized alkyl ester-based composition may have an iodine value (I.V.) of less than 3.5 $I_2g/100$ g (hereinafter, the unit "$I_2g/100$ g" is omitted), preferably 3.2 or less, and more preferably 3.0 or less.

When the epoxidized alkyl ester-based composition is applied to a plasticizer composition, the measured iodine value and oxirane content thereof may be important factors.

Particularly, in the case of a plasticizer composition included in a food wrapping material in which environmental friendliness is essential, an iodine value and an oxirane content may affect the properties of the plasticizer.

When an iodine value (I.V.) is 3.5 or more, the plasticizer composition is not up to standard in sensory evaluation. For example, the color of a plasticizer composition may become dark, which causes a problem in which a plasticizer composition is inappropriate for use as a food wrapping material. Also, incidentally, when an iodine value is less than 3.5, mechanical properties such as tensile strength, elongation rate, and the like may be improved together.

Therefore, the epoxidized alkyl ester-based composition may have an iodine value (I.V.) of preferably less than 3.5, more preferably 3.2 or less, and most preferably 3.0 or less. The iodine value refers to a content of double bonds present in a molecule, and may be derived from a value measured by titration through iodination of the double bond.

In addition, the oxirane content may vary depending on the number of epoxy groups contained in a substituent represented by $R_1$ in Chemical Formula 1, and may be 3.5% or more, 4.0% or more, 4.2% or more, and preferably, 4.5% or more. The oxirane content may be measured by titration, specifically by titration using a sample and an acidic solution.

The iodine value refers to a content of double bonds, and the content of double bonds may be a content of double bonds which remain after epoxidation such as epoxidation of a vegetable oil or fatty acid alkyl ester. That is, the oxirane content and iodine value may be indicators to show an epoxidized degree, so they may be related to each other to a certain extent, and be theoretically inversely proportional to each other.

However, since double bonds of a vegetable oil or fatty acid alkyl ester may vary substantially depending on a material, the two parameters do not necessarily form an exact inverse or trade-off relationship, and a material having a higher iodine value may simultaneously have a higher oxirane content between two materials. Therefore, it may be preferable that an epoxidized alkyl ester material having an iodine value and oxirane content in the above ranges be applied to a plasticizer composition used for an environmentally-friendly food wrapping material.

Meanwhile, the epoxidized alkyl ester compound may have an oxirane index (O.I.) of 1.0 or more.

The relationship between an iodine value and an oxirane content is as described above, but simultaneously, it may be preferable that an oxirane index be 1.5 or more, optimally, 2.0 or more. The term "oxirane index" used herein refers to a ratio of an oxirane content of the epoxidized alkyl ester compound to an iodine value thereof, and may be a ratio of double bonds epoxidized through epoxidation and remaining double bonds that are not reacted.

Specifically, the oxirane index may be a ratio of an oxirane content to an iodine value, and may be 1.5 or more. That is, when a value obtained by dividing an oxirane content of the epoxidized alkyl ester by an iodine value thereof is 1.5 or more, preferably 2.0 or more, it is possible to obtain a more optimized plasticizer composition.

The epoxidized alkyl ester composition may include one or more epoxidized fatty acid alkyl esters (eFAAEs), specifically, one or more compounds represented by Chemical Formula 2, and the "alkyl" of the epoxidized alkyl ester compound may have 4 to 10 carbon atoms.

That is, $R_4$ in Chemical Formula 2 may have 4 to 10 carbon atoms, preferably 4 to 9 carbon atoms, and more preferably 4 to 8 carbon atoms. Further, $R_4$ in Chemical Formula 2 may be a butyl group (abbreviated as B), an isobutyl group (abbreviated as iB), a pentyl group (abbreviated as P), a hexyl group (abbreviated as Hx), a heptyl group (abbreviated as Hp), an isoheptyl group (abbreviated as iHp), an octyl group (abbreviated as nO), a 2-ethylhexyl group (abbreviated as EH or O), a nonyl group (abbreviated as nN), an isononyl group (abbreviated as IN), a 6-methyloctyl group (abbreviated as MO), a decyl group (abbreviated as D), an isodecyl group (abbreviated as ID), or a 2-propylheptyl group (abbreviated as PH).

When $R_4$ in Chemical Formula 2 has 4 to 10 carbon atoms, transparency (haze value) and volatile loss may be excellent. Transparency is an important property in a plasticizer applied to a resin for a food wrapping material. Therefore, when transparency is poor, a plasticizer has no commerciality and thus cannot be applied, and when volatile loss is poor, a plasticizer is easily volatilized when heat is applied during processing and thus processability and workability become poor, thereby it may be difficult to apply a plasticizer to a resin for a food wrapping material. Accordingly, it may be preferable to adjust $R_4$ in the epoxidized alkyl ester compounds represented by Chemical Formula 2 to have 4 to 10 carbon atoms.

When the epoxidized alkyl ester composition includes a material having less than 4 carbon atoms, for example, a material having a small number of carbon atoms such as epoxidized methyl ester having 1 carbon atom or the like, migration ability and volatile loss may be significantly poor, and transparency, adhesiveness and elongation rate may be degraded. When an epoxidized alkyl ester having more than 10 carbon atoms is applied, the molecular weight is too high, and thus there may be a problem of migration ability caused by a degradation of plasticization efficiency and compatibility with a resin. Therefore, it may be preferable that an epoxidized alkyl ester included in the epoxidized alkyl ester composition be limited to have 4 to 10 carbon atoms, and adjusted to have 4 to 8 carbon atoms to achieve an optimized property.

The plasticizer composition may include the cyclohexane 1,4-diester-based material and the epoxidized alkyl ester-based material in a weight ratio of 99:1 to 1:99 or 90:10 to 10:90. An upper limit of the weight ratio range may be 90:10, 85:15, 80:20, 70:30, or 60:40, and a lower limit thereof may be 10:90, 15:85, 20:80, 30:70, or 40:60.

In order to achieve a desired property, a specific ratio may be adjusted within the above weight range, and applied so as to be suitable for use.

The plasticizer composition includes the epoxidized alkyl ester-based material and the cyclohexane 1,4-diester-based material, and may also further include an epoxidized oil.

In the case of the plasticizer composition in which the epoxidized alkyl ester-based material and the cyclohexane 1,4-diester-based material are mixed, thermal resistance among various properties may be relatively poor, which may be complemented by further including the epoxidized oil.

Examples of the epoxidized oil include epoxidized soybean oil (ESO), epoxidized castor oil, epoxidized linseed oil (ELO), epoxidized palm oil, an epoxidized stearate, an epoxidized oleate, epoxidized tall oil, an epoxidized linoleate, and a mixture thereof. Preferably, ESO or ELO may be used, but the present invention is not limited thereto.

In addition, the epoxidized oil may be included in an amount of 1 to 100 parts by weight, preferably 1 to 80 parts by weight with respect to 100 parts by weight of a mixed weight of the epoxidized alkyl ester-based material and the cyclohexane 1,4-diester-based material. When the amount of the epoxidized oil is within the above range, a plasticizer composition having appropriately excellent mechanical properties and thermal resistance may be achieved.

As a method of preparing the plasticizer composition in the present invention, a blending method may be used, and the blending preparation method is as follows.

The plasticizer composition may be prepared by preparing a compound represented by Chemical Formula 1 below and a compound represented by Chemical Formula 2 below and blending a cyclohexane 1,4-diester-based material and an epoxidized alkyl ester-based material which are represented by Chemical Formulas 1 and 2, respectively, in a weight ratio of 99:1 to 1:99. In this case, one or more epoxidized alkyl ester-based materials and one or more cyclohexane 1,4-diester-based materials are included.

[Chemical Formula 1]

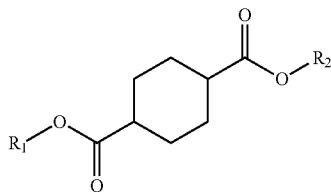

In Chemical Formula 1, $R_1$ and $R_2$ each independently are the same or different, and are C4 to C12 alkyl groups.

[Chemical Formula 2]

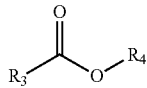

In Chemical Formula 2, $R_3$ is a C8 to C20 alkyl group containing one or more epoxy groups, and $R_4$ is a C4 to C10 alkyl group.

In the present invention, the method of preparing the plasticizer composition may be performed through esterification.

First, a method of preparing the cyclohexane 1,4-diester-based material including a compound represented by Chemical Formula 1 will be described.

The cyclohexane 1,4-diester-based material is prepared through esterification and hydrogenation, and when the cyclohexane 1,4-diester-based material is a mixture, the order of the two reactions is not particularly limited. For example, the first mixture may be prepared by performing trans-esterification of butanol after performing hydrogenation of di(2-ethylhexyl) terephthalate or by performing hydrogenation of di(2-ethylhexyl) terephthalate after performing trans-esterification of butanol.

Meanwhile, the hydrogenation may be a reaction for eliminating the aromaticity of benzene rings of the terephthalate-based materials by adding hydrogen in the presence of a metal catalyst, which may be a type of reduction.

The hydrogenation is a reaction for synthesizing a cyclohexane 1,4-diester-based material by reacting the terephthalate-based material and hydrogen in the presence of a metal catalyst, and conditions for this reaction may include all of the conventional reaction conditions for hydrogenating only benzene rings without affecting carbonyl groups substituted in the benzenes.

The hydrogenation may be performed with an additional organic solvent such as ethanol or the like, but the present invention is not limited thereto. The metal catalyst may be an Rh/C catalyst, a Pt catalyst, a Pd catalyst, or the like, which is generally used to hydrogenate a benzene ring, and any one capable of being used in the hydrogenation is used without limitation.

Alternatively, the cyclohexane 1,4-diester-based material may be prepared by using 1,4-cyclohexanedicarboxylic acid instead of terephthalic acid as a raw material. In this case, a cyclohexane 1,4-diester-based material which is a single compound may be prepared by performing direct esterification of 1,4-cyclohexanedicarboxylic acid with one alcohol, and a cyclohexane 1,4-diester-based material which is a mixture may be prepared by performing direct esterification of 1,4-cyclohexanedicarboxylic acid with two or more alcohols or by performing direct esterification of 1,4-cyclohexanedicarboxylic acid with one alcohol and subsequently trans-esterification with another alcohol.

In addition, dimethyl cyclohexane 1,4-diester may be used instead of 1,4-cyclohexanedicarboxylic acid. In this case, a cyclohexane 1,4-diester-based material which is a single compound or a mixture may also be prepared through esterification as when the dicarboxylic acid is used.

As described above, the cyclohexane 1,4-diester-based material may be prepared without performing hydrogenation, and this method may reduce a risk involved in the process or a burden of high processing costs caused by hydrogenation.

However, a method of preparing the cyclohexane 1,4-diester-based material is not particularly limited as long as it prepares a cyclohexane 1,4-diester-based material including a compound represented by Chemical Formula 1.

In addition, the epoxidized alkyl ester-based material may be prepared through esterification. The epoxidized alkyl ester-based material may be prepared by reacting an epoxidized oil and a C1 to C10 alkyl alcohol.

Basic characteristics of the epoxidized alkyl ester-based material such as an iodine value, an oxirane content, and the like have been described above, and therefore will be omitted.

The reaction between an epoxidized oil and a C1 to C10 alkyl alcohol may be trans-esterification.

The "trans-esterification" refers to a reaction between an alcohol and an ester as shown in Reaction Scheme 1, in which R" of the ester is interchanged with R' of the alcohol:

[Reaction Scheme 1]

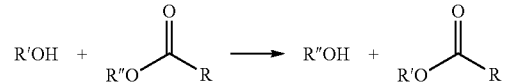

The trans-esterification may produce three types of ester compositions according to three cases in which an alkoxide of the alcohol attacks carbons of two ester (RCOOR") groups present in an ester-based compound; an alkoxide of the alcohol attacks carbons of one ester (RCOOR") group present in an ester-based compound; and there is no reaction between an alcohol and an ester group in an ester-based compound.

In addition, compared to acid-alcohol esterification, the trans-esterification does not cause water contamination and may solve problems caused by the use of an acidic catalyst because the reaction can be performed without a catalyst.

According to the present invention, the ester in the trans-esterification may be an epoxidized oil, and the alcohol may be a primary alcohol having a C1 to C10 alkyl group. The alcohol may have 1 to 10 carbon atoms, preferably, 4 to 8 carbon atoms, and the alkyl group of the alcohol may correspond to $R_4$ in Chemical Formula 2 after the reaction is completed.

In addition, examples of the epoxidized oil include epoxidized soybean oil, epoxidized castor oil, epoxidized linseed oil, epoxidized palm oil, an epoxidized stearate, an epoxidized oleate, epoxidized tall oil, an epoxidized linoleate, and a mixture thereof, and the epoxidized oil may be a compound prepared by introducing a predetermined amount of epoxy groups through epoxidation of a vegetable oil.

The epoxidized oil may be represented, for example, by Chemical Formula 3 below, may include three ester groups in one molecule, and may contain a predetermined amount of epoxy groups.

In addition, a process of removing a polyhydric alcohol and a reaction by-product produced after the trans-esterification and an unreacted alcohol through separation, washing, and distillation may be further performed.

In the purification, specifically, cooling and maintaining the products, the unreacted alcohol, and the like at 80 to 100° C. for a predetermined time may be performed after the trans-esterification. In this case, layer separation occurs, and may result in an upper layer containing an epoxidized alkyl ester and an alcohol and a lower layer containing glycerine and other by-products. Next, in order to neutralize a catalyst, an aqueous solution for neutralizing a catalyst may be added to induce neutralization and washing.

The neutralization and washing processes may be performed after a lower layer mainly including by-products is first separated. In the neutralization and washing processes,

[Chemical Formula 3]

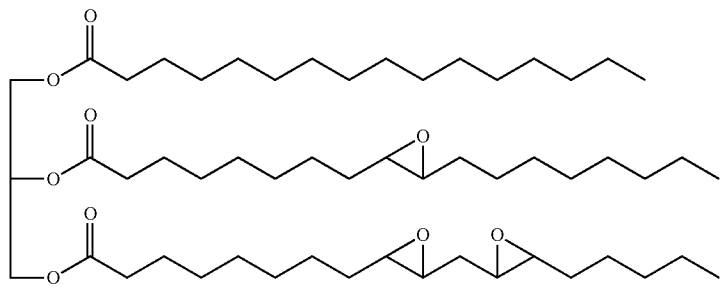

The epoxidized oil represented by Chemical Formula 3 is one example.

In addition, the epoxidized oil may have an iodine value (I.V.) of less than 4 $I_2g/100$ g. This iodine value (I.V.) slightly fluctuates during trans-esterification, and thus may be almost equivalent to the iodine value (I.V.) of an epoxidized alkyl ester-based material, which is a product, and details of the iodine value (I.V.) of the epoxidized oil are the same as the aforementioned description of the iodine value (I.V.) of the epoxidized alkyl ester-based material.

When the epoxidized oil and the C1 to C10 alkyl alcohol are trans-esterified, all of the three ester groups may be separated. Accordingly, three or more types of epoxy-based ester compounds in which an alkyl group of the alcohol is newly bound may be formed.

The trans-esterification may be performed at a temperature of 40 to 230° C., preferably 50 to 200° C., and more preferably 50 to 180° C. for 10 minutes to 10 hours, preferably 30 minutes to 8 hours, and more preferably 1 to 6 hours. Within the above temperature and time range, a desired epoxidized alkyl ester-based material may be effectively achieved. Here, the reaction time may be calculated from the point of time to reach the reaction temperature after raising the temperature of the reactants.

The trans-esterification may be performed in the presence of a basic catalyst, acidic catalyst or metal catalyst, which provides an effect of reducing a reaction time.

Examples of the acidic catalyst include sulfuric acid, methanesulfonic acid, p-toluenesulfonic acid, and the like, and examples of the metal catalyst include an alkoxide-based organometallic catalyst, a metal oxide catalyst, a metal salt catalyst, and a metal itself, which include sodium or potassium.

A metal component of the metal catalyst may be, for example, any one or a mixture of two or more selected from the group consisting of sodium, potassium, tin, titanium, and zirconium.

the by-products included in the lower layer may be dissolved in water and discharged. Afterward, washing may be repeatedly performed to recover and remove an unreacted alcohol and moisture.

However, it may be necessary to vary the neutralization and washing processes according to the number of carbon atoms of an alcohol used in the trans-esterification.

For example, in the case of using butanol having 4 carbon atoms, when the neutralization and washing processes are directly performed, waste water may be produced, and therefore, it may be preferable to remove butanol through distillation in advance. However, in this case, since the catalyst remains active, glycerol as a by-product and an epoxidized alkyl ester as a product may be reversely reacted to produce an epoxidized oil-like material such as a diglyceride, a triglyceride, or the like. Therefore, it is necessary to design the process with caution.

As another example, in the case of using 2-ethylhexyl alcohol having 8 carbon atoms, waste water is not produced due to low solubility of 2-ethylhexyl alcohol in water. Therefore, both cases in which an alcohol is removed after neutralization and washing processes and in which neutralization and washing processes are performed after by-products in a lower layer are removed may proceed without critical problems.

The epoxidized alkyl ester-based material thus prepared may be blended with a cyclohexane 1,4-diester-based material in accordance with the above-described range of a mixing weight ratio. In this case, a mixing ratio or an applicable cyclohexane 1,4-diester-based material has been described above, and therefore will be omitted.

After the blending with a cyclohexane 1,4-diester-based material, an epoxidized oil may be further added as necessary. In this case, the epoxidized oil may be selected from those exemplified above, and an addition amount thereof may be 1 to 100 parts by weight, preferably 1 to 80 parts by weight with respect to 100 parts by weight of a mixed weight of the epoxidized alkyl ester-based material and the cyclohexane 1,4-diester-based material. Characteristics of the epoxidized oil have been described above, and therefore will be omitted.

According to another embodiment of the present invention, there is provided a resin composition including 100 parts by weight of a resin; and 5 to 150 parts by weight of the above-described plasticizer composition.

The resin may be one or more selected from the group consisting of ethylene vinyl acetate, polyethylene, polypropylene, polyketone, polyvinyl chloride, polystyrene, polyurethane, and a thermoplastic elastomer.

The plasticizer composition may be included in an amount of preferably 5 to 100 parts by weight, 5 to 50 parts by weight or 50 to 150 parts by weight in some cases, and more preferably 30 to 60 parts by weight with respect to 100 parts by weight of the resin. In this case, a resin composition which is effective when applied as a compound, sheet, or plastisol may be provided.

The resin composition includes the plasticizer composition as described above, and thus may be applied for various purposes such as flooring materials, wallpaper, films, hoses, electric wires, or the like. Also, the resin composition may exhibit basic mechanical properties such as tensile strength, elongation rate, plasticization efficiency, and volatile loss equal to or higher than those of an existing plasticizer.

According to an embodiment of the present invention, the resin composition may further include a filler.

The filler may be included in an amount of 0 to 300 parts by weight, preferably, 50 to 200 parts by weight, and more preferably, 100 to 200 parts by weight with respect to 100 parts by weight of the resin.

The filler may be any filler known in the art without particular limitation. For example, a mixture of one or more selected from silica, magnesium carbonate, calcium carbonate, hard charcoal, talc, magnesium hydroxide, titanium dioxide, magnesium oxide, calcium hydroxide, aluminum hydroxide, aluminum silicate, magnesium silicate, and barium sulfate may be used as the filler.

In addition, the resin composition may further include other additives such as a stabilizer and the like as necessary.

The additives such as a stabilizer and the like may be included, for example, in an amount of 0 to 20 parts by weight, preferably 1 to 15 parts by weight with respect to 100 parts by weight of the resin.

Examples of the stabilizer that may be used according to an embodiment of the present invention include a calcium-zinc (Ca—Zn)-based stabilizer such as a calcium-zinc combined stearate or the like, but the present invention is not particularly limited thereto.

EXAMPLES

Hereinafter, the present invention will be described in detail with reference to embodiments. However, the embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Preparation Example 1

Preparation of diisononyl cyclohexane-1,4-diester

1) Esterification 498.0 g of purified terephthalic acid (PTA), 1,300 g of isononanol (INA) (a molar ratio of PTA:INA=1.0:3.0), and 1.54 g (0.31 part by weight with respect to 100 parts by weight of PTA) of a titanium-based catalyst (tetraisopropyl titanate (TIPT)) were added to a 3 L four-neck reaction vessel equipped with a cooler, a condenser, a decanter, a reflux pump, a temperature controller, a stirrer, and the like, and then the temperature of the reaction vessel was slowly raised up to about 170° C. The generation of produced water started at about 170° C., and esterification was performed at a reaction temperature of about 220° C. under an atmospheric pressure condition for about 4.5 hours while continuously introducing nitrogen gas and was terminated when an acid value reached 0.01.

After the reaction was completed, distillation extraction was performed under reduced pressure for 0.5 to 4 hours to remove unreacted raw materials. To reduce the level of the unreacted raw materials to a predetermined content level or less by removing the same, steam extraction was performed for 0.5 to 3 hours under reduced pressure using steam. A temperature of a reaction solution was cooled to about 90° C. to perform neutralization treatment using an alkaline solution. In this case, washing may be optionally performed. Thereafter, the reaction solution was dehydrated to remove water. A filtering material was introduced into the dehydrated reaction solution, stirred for a predetermined period of time, and then filtered, thereby finally obtaining 1,243 g of diisononyl terephthalate (yield: 99.0%).

2) Hydrogenation 1,000 g of the composition produced by the esterification and 20 g of a ruthenium catalyst (N.E CHEMCAT) were added as raw materials to a 1.5 L high-pressure reaction vessel, and hydrogen was added under a pressure of 8 MPa to perform hydrogenation at 150° C. for 3 hours, and then the reaction was completed. After the reaction was completed, the catalyst was filtered and a conventional purification process was performed, thereby preparing diisononyl cyclohexane-1,4-diester with a yield of 99%.

Preparation Example 2

Preparation of di(2-propylheptyl) cyclohexane-1,4-diester

Di(2-propylheptyl) cyclohexane-1,4-diester was prepared by performing esterification and hydrogenation in the same manner as in Preparation Example 1 except that 2-propylheptyl alcohol was used instead of isononyl alcohol in esterification.

Preparation Example 3

Preparation of di(2-ethylhexyl) cyclohexane-1,4-diester 516.0 g of 1,4-cyclohexanedicarboxylic acid (CHCA), 1,171 g of 2-ethylhexanol (2-EH) (a molar ratio of CHCA:2-EH=1.0:3.0), and 1.60 g (0.31 part by weight with respect to 100 parts by weight of CHCA) of a titanium-based catalyst (tetraisopropyl titanate (TIPT)) were added to a 3 L four-neck reaction vessel equipped with a cooler, a condenser, a decanter, a reflux pump, a temperature controller, a stirrer, and the like, and then the temperature of the reaction vessel was slowly raised up to about 170° C. The generation of produced water started at about 170° C., and esterification was performed at a reaction temperature of about 220° C. under an atmospheric pressure condition for about 4.5 hours while continuously introducing nitrogen gas and was terminated when an acid value reached 0.01.

After the reaction was completed, distillation extraction was performed under reduced pressure for 0.5 to 4 hours to remove unreacted raw materials. To reduce the level of the unreacted raw materials to a predetermined content level or less by removing the same, steam extraction was performed for 0.5 to 3 hours under reduced pressure using steam. A temperature of a reaction solution was cooled to about 90° C. to perform neutralization treatment using an alkaline solution. In this case, washing may be optionally performed. Thereafter, the reaction solution was dehydrated to remove water. A filtering material was introduced into the dehydrated reaction solution, stirred for a predetermined period of time, and then filtered, thereby finally obtaining 1,178 g of di(2-ethylhexyl) cyclohexane-1,4-diester (yield: 99.0%).

Preparation Example 4

Preparation of Hydrogenated Mixture of DEHTP/BEHTP/DBTP

1) Esterification 2,000 g of di(2-ethylhexyl) terephthalate (DEHTP) and 340 g of n-butanol (17 parts by weight with respect to 100 parts by weight of DEHTP) were added to a reaction vessel equipped with a stirrer, a condenser, and decanter, and then trans-esterification was performed at a reaction temperature of about 160° C. under a nitrogen atmosphere for 2 hours, thereby obtaining an ester-based plasticizer composition including dibutyl terephthalate (DBTP), butyl(2-ethylhexyl) terephthalate (BEHTP), and di(2-ethylhexyl) terephthalate (DEHTP) at 4.0 wt %, 35.0 wt %, and 61.0 wt %, respectively.

The reaction product was subjected to mixed distillation to remove butanol and 2-ethylhexyl alcohol, thereby finally preparing a mixed composition.

2) Hydrogenation

A hydrogenated mixed composition was prepared by performing hydrogenation of the mixed composition in the same manner as in Preparation Example 1.

Preparation Example 5

Preparation of Hydrogenated Mixture of DINTP/EHINTP/DEHTP

1) Esterification 498.0 g of purified terephthalic acid (PTA), 975 g of 2-ethylhexyl alcohol (2-EH) (a molar ratio of PTA:2-EH=1.0:2.5), and 216.5 g of isononyl alcohol (INA) (a molar ratio of PTA:INA=1.0:0.5) were added to a 3 L four-neck reaction vessel equipped with a cooler, a condenser, a decanter, a reflux pump, a temperature controller, a stirrer, and the like. 1.54 g (0.31 part by weight with respect to 100 parts by weight of PTA) of a titanium-based catalyst (tetraisopropyl titanate (TIPT)) was added thereto, and then the temperature of the reaction vessel was slowly raised up to about 170° C. The generation of produced water started at about 170° C., and esterification was performed at a reaction temperature of about 220° C. under an atmospheric pressure condition for about 4.5 hours while continuously introducing nitrogen gas and was terminated when an acid value reached 0.01.

After the reaction was completed, distillation extraction was performed under reduced pressure for 0.5 to 4 hours to remove unreacted raw materials. To reduce the level of the unreacted raw materials to a predetermined content level or less by removing the same, steam extraction was performed for 0.5 to 3 hours under reduced pressure using steam. A temperature of a reaction solution was cooled to about 90° C. to perform neutralization treatment using an alkaline solution. In this case, washing may be optionally performed. Thereafter, the reaction solution was dehydrated to remove water. A filtering material was introduced into the dehydrated reaction solution, stirred for a predetermined period of time, and then filtered, thereby finally obtaining a mixed composition.

2) Hydrogenation

A hydrogenated mixed composition was prepared by performing hydrogenation of the mixed composition in the same manner as in Preparation Example 1.

Preparation Example 6

Preparation of eFAEHE 1,000 g of epoxidized soybean oil (ESO) having an oxirane content of 6.97% and an iodine value of 1.93 ($I_2$g/100 g), 500 g of 2-ethylhexyl alcohol (2-EH), and 5.5 g of a metallic salt catalyst were input to a 3 L four-neck reaction vessel equipped with a cooler, a condenser, a decanter, a reflux pump, a temperature controller, an stirrer, and the like, and a temperature of the reaction vessel was slowly raised up to about 180° C.

After it was confirmed through a gas chromatography assay that ESO as a raw material was completely reacted and thus consumed, the reaction was terminated. After the reaction was completed, glycerine as a by-product and unreacted raw materials were removed, and a product was purified, thereby finally obtaining 1,210 g of an epoxidized 2-ethylhexyl ester composition having an oxirane content (O.C.) of 5.21% and an iodine value (I.V.) of 1.70.

Preparation Example 7

Preparation of eFABE

An epoxidized butyl ester composition having an oxirane content (O.C.) and an iodine value (I.V.) as listed in Table 1 below was prepared in the same manner as in Preparation Example 6 except that butanol was used instead of 2-ethylhexanol.

Preparation Example 8

Preparation of eFAEHE

An epoxidized 2-ethylhexyl ester composition having an oxirane content (O.C.) of 3.37% and an iodine value (I.V.) of 3.40 was prepared in the same manner as in Preparation Example 6 except that ESO having an oxirane content (O.C.) lower than that in Preparation Example 6 was used.

Preparation Example 9

Preparation of eFAINE

An epoxidized isononyl ester composition having an oxirane content (O.C.) and an iodine value (I.V.) as listed in Table 1 below was prepared in the same manner as in Preparation Example 6 except that isononanol was used instead of 2-ethylhexanol.

Comparative Preparation Example 1

Preparation of eFAME

An epoxidized methyl ester composition was prepared in the same manner as in Preparation Example 6 except that methanol was used instead of 2-ethylhexanol.

Comparative Preparation Example 2

Preparation of eFAPE

An epoxidized propyl ester composition was prepared in the same manner as in Preparation Example 6 except that propanol was used instead of 2-ethylhexanol.

Comparative Preparation Example 3

Preparation of eFADDE

An epoxidized dodecyl ester composition was prepared in the same manner as in Preparation Example 6 except that dodecanol was used instead of 2-ethylhexanol.

Examples and Comparative Examples

The compositions according to Preparation Examples 1 to 9 and Comparative Preparation Examples 1 to 3 were used to constitute Examples 1 to 10 and Comparative Examples 1 to 5 as listed in Tables 1 and 2 below.

TABLE 1

| | Cyclohexane 1,4-diester | Epoxidized alkyl ester | | | Epoxidized oil | Mixing ratio |
|---|---|---|---|---|---|---|
| | | Carbon number | O.C. | I.V. | | |
| Example 1 | 1,4-DEHCH | 8 (Preparation Example 6) | 5.21 | 1.70 | — | 9:1 |
| Example 2 | 1,4-DEHCH | 8 (Preparation Example 6) | 5.21 | 1.70 | — | 7:3 |
| Example 3 | 1,4-DEHCH | 8 (Preparation Example 6) | 5.21 | 1.70 | — | 5:5 |
| Example 4 | 1,4-DPHCH | 4 (Preparation Example 7) | 5.18 | 1.68 | — | 8:2 |
| Example 5 | 1,4-DINCH | 9 (Preparation Example 9) | 5.22 | 1.72 | — | 5:5 |
| Example 6 | 1,4-DEHCH | 9 (Preparation Example 9) | 5.22 | 1.72 | — | 7:3 |
| Example 7 | Preparation Example 4 | 8 (Preparation Example 6) | 5.21 | 1.70 | — | 4:6 |
| Example 8 | Preparation Example 5 | 4 (Preparation Example 7) | 5.18 | 1.68 | — | 3:7 |
| Comparative Example 1 | 1,4-DEHCH | 1 (Comparative Preparation Example 1) | | | — | 7:3 |
| Comparative Example 2 | 1,4-DEHCH | 3 (Comparative Preparation Example 2) | | | — | 5:5 |
| Comparative Example 3 | 1,4-DEHCH | 12 (Comparative Preparation Example 3) | | | — | 7:3 |
| Comparative Example 4 | 1,4-DEHCH | 8 (Preparation Example 8) | 3.37 | 3.40 | — | 7:3 |
| Comparative Example 5 | 1,4-DEHCH | — | — | — | — | |

TABLE 2

| | Cyclohexane 1,4-diester (first composition) | Epoxidized alkyl ester (second composition) | Mixing ratio (first:second) | Epoxidized oil (third composition) | Mixing ratio (first + second):(third) |
|---|---|---|---|---|---|
| Example 9 | 1,4-DEHCH | 8 (Preparation Example 6) | 9:1 | ESO (10%) | 9:1 |
| Example 10 | 1,4-DEHCH | 8 (Preparation Example 6) | 9:1 | ESO (30%) | 7:3 |

Experimental Example 1

Specimen Preparation and Performance Evaluation

The plasticizers according to Examples 1 to 10 and Comparative Examples 1 to 5 were used as experimental specimens. For specimen preparation, referring to ASTM D638, 40 parts by weight of each of the plasticizers and 3 parts by weight of a stabilizer (LOX 912 NP) were mixed with 100 parts by weight of PVC in a mixer, and the resulting mixture was then subjected to roll-milling at 170° C. for 4 minutes and pressed for 2.5 minutes (low pressure) and 2 minutes (high pressure) at 180° C. using a press, thereby manufacturing 1 T and 3 T sheets. Each specimen was subjected to tests for the following properties, the results of which are shown in Tables 3 and 4 below.

<Test Items>

Measurement of Hardness

According to ASTM D2240, Shore hardness was measured at 25° C. under 3 T and 10 s conditions.

Measurement of Tensile Strength

According to ASTM D638, each specimen was pulled at a cross head speed of 200 mm/min (1 T) using a tester, U.T.M, (Manufacturer; Instron, Model No. 4466), and a point at which the specimen was broken was then determined. The tensile strength was calculated as follows:

Tensile strength (kgf/cm$^2$)=Load value (kgf)/Thickness (cm)×Width (cm)

Measurement of Elongation Rate

According to ASTM D638, each specimen was pulled at a cross head speed of 200 mm/min (1 T) using the U.T.M, and a point at which the specimen was broken was then determined. The elongation rate was calculated as follows:

Elongation rate(%)=Length after elongation/Initial length×100

Measurement of Migration Loss

A specimen having a thickness of 2 mm or more was obtained according to KSM-3156, PS plates were attached to both sides of the specimen, and then a load of 1 kgf/cm$^2$ was applied thereto. The specimen was placed in a hot-air convection oven (80° C.) for 72 hours, then taken out of the oven, and cooled at room temperature for 4 hours. Thereafter, the PS plates attached to both sides of the specimen were removed, weights of the specimen before and after being placed in the oven along with the glass plates were measured. The migration loss was calculated by the equation as follows.

Migration loss(%)={(Initial weight of specimen at room temperature−Weight of specimen after being placed in oven)/Initial weight of specimen at room temperature}×100

Measurement of Volatile Loss

The prepared specimen was processed at 80° C. for 72 hours, and then a weight of the specimen was measured.

Volatile loss (wt %)=Initial weight of specimen−(Weight of specimen after being processed at 80° C. for 72 hours)/Initial weight of specimen×100

Measurement of Migration Upon Stress (Loop)

According to ASTM D3291, the prepared specimen was placed in a constant temperature and humidity bath under a humidity of 50% at 23° C. for 168 hours, and then a migration degree of the plasticizer was evaluated on a scale of 0 (excellent) to 3 (poor).

Measurement of Absorption Rate 400 g of PVC (LS100S commercially available from LG Chem) was input into a planetary mixer preheated to 80° C., and stirred at a rate of 60 rpm. After 5 minutes, 200 g of a prepared plasticizer was input into the mixer, and then a change in a torque occurring during stirring was observed to determine the time taken to completely mix the plasticizer with a resin. In this case, an overly fast absorption rate causes a time required to induce gelling to be insufficiently ensured, and thus processability may be degraded. On the other hand, an overly slow absorption rate causes a usage amount of energy to be increased due to an increase in a mixing time and a mixing temperature, and thus productivity may be degraded.

TABLE 3

|  | Hardness (Shore "A") | Tensile strength (kg/cm$^2$) | Elongation rate (%) | Migration loss (%) | Volatile loss (%) | Stress test (0~3) | Absorption rate (mm:ss) |
| --- | --- | --- | --- | --- | --- | --- | --- |
| Example 1 | 90.1 | 208.0 | 289.8 | 1.41 | 1.11 | 1.0 | 4:40 |
| Example 2 | 89.7 | 206.4 | 290.4 | 1.20 | 0.87 | 1.0 | 4:12 |
| Example 3 | 89.0 | 204.8 | 294.1 | 1.11 | 0.50 | 1.0 | 3:50 |
| Example 4 | 89.9 | 204.0 | 291.4 | 1.56 | 1.05 | 0.5 | 4:20 |
| Example 5 | 90.4 | 200.2 | 286.8 | 1.88 | 0.43 | 1.5 | 4:57 |
| Example 6 | 90.2 | 201.2 | 290.3 | 1.90 | 0.75 | 1.5 | 4:18 |
| Example 7 | 88.7 | 200.4 | 291.6 | 2.01 | 1.80 | 0.5 | 3:15 |
| Example 8 | 88.9 | 204.7 | 289.8 | 2.35 | 1.97 | 0.5 | 3:20 |
| Comparative Example 1 | 87.9 | 190.5 | 277.3 | 4.33 | 5.69 | 0.5 | 2:45 |
| Comparative Example 2 | 87.8 | 191.3 | 280.4 | 4.20 | 6.48 | 1.0 | 2:55 |
| Comparative Example 3 | 91.2 | 215.6 | 260.6 | 4.57 | 1.01 | 2.0 | 5:35 |
| Comparative Example 4 | 90.3 | 202.7 | 274.3 | 3.72 | 0.90 | 2.0 | 5:15 |
| Comparative Example 5 | 89.8 | 211.2 | 230.2 | 5.10 | 1.70 | 2.0 | 4:52 |

Referring to Table 3, it can be confirmed that a case in which the plasticizers according to Examples 1 to 8 were used exhibited an improvement in all properties compared to a case in which the plasticizers according to Comparative Examples 1 to 5 were used. That is, it can be confirmed that all properties were generally improved without any significantly poor property, an absorption rate was uniformly distributed, and migration loss was significantly improved.

Specifically, it can be confirmed that Comparative Examples 1 and 2, in which epoxidized alkyl esters having a small carbon number were used, exhibited significantly poor volatile loss and migration loss, and also exhibited lower tensile strength compared to Examples 1 to 10. In particular, it can be seen that Comparative Example 2 exhibited about 4 to 6 times increased volatile loss and migration loss compared to Examples 4 and 8 even though a difference in the carbon number was 1, indicating that properties were significantly degraded.

In addition, it can be confirmed that Comparative Example 3, in which an epoxidized alkyl ester having a large carbon number were used, exhibited a significant loss in elongation rate and a difference of about three times as much migration loss compared to Examples 1 to 10, indicating a poor level. Also, it can be seen that Comparative Example 3 did not exhibit appropriate levels of absorption rate and stress resistance.

Furthermore, it can be confirmed that Comparative Example 5, in which an epoxidized alkyl ester was not used in combination, exhibited a significantly poor elongation rate and significantly poor migration loss, and Comparative Example 4, in which an epoxidized alkyl ester not satisfying an oxirane index of 2.0 or more and an oxirane content of less than 3.5% was used, exhibited a poor elongation rate, poor migration loss, an unsatisfactory absorption rate, and particularly, a significant degradation of migration resistance against stress even though the carbon number thereof was the same as in Examples 1 to 3 and 7.

From these results, it can be confirmed that when a cyclohexane 1,4-diester-based material and an epoxidized alkyl ester-based material were used in combination for a plasticizer, carbon number of each of the materials and the oxirane index of an epoxidized alkyl ester significantly affect properties. Also, it can be seen that when all of these conditions are satisfied, all properties are generally improved to excellent levels without any degradation of properties.

TABLE 4

|  | Hardness (Shore "A") | Tensile strength (kg/cm$^2$) | Elongation rate (%) | Migration loss (%) | Volatile loss (%) | Stress test (0~3) | Absorption rate (mm:ss) |
|---|---|---|---|---|---|---|---|
| Example 1 | 90.1 | 208.0 | 289.8 | 1.41 | 1.11 | 1.0 | 4:40 |
| Example 9 | 90.2 | 215.4 | 305.7 | 1.10 | 1.02 | 0.5 | 4:50 |
| Example 10 | 90.5 | 220.6 | 310.5 | 0.95 | 0.88 | 0.5 | 5:05 |

Referring to Table 4, it can be confirmed that Example 9 in which the plasticizer according to Example 1 was mixed with ESO as an epoxidized oil in a mixing ratio of 10% (Example 1:ESO=9:1) and Example 10 in which the plasticizer according to Example 1 was mixed with ESO as an epoxidized oil in a mixing ratio of 30% (Example 1:ESO=7:3) exhibited an improvement in all of tensile strength, elongation rate, migration loss, volatile loss, and migration resistance against stress compared to Example 1.

From these results, it can be confirmed that when an epoxidized oil is additionally added, properties are further improved.

The invention claimed is:
1. A plasticizer composition comprising:
a cyclohexane 1,4-diester-based material including one or more compounds represented by Chemical Formula 1; and
an epoxidized alkyl ester-based material including one or more compounds represented by Chemical Formula 2,
wherein a weight ratio of the cyclohexane 1,4-diester-based material and the epoxidized alkyl ester-based material is 99:1 to 1:99, and
wherein the epoxidized alkyl ester-based material has an oxirane index (O.I.) of 2.0 or more and an oxirane content (O.C.) of 3.5% or more:

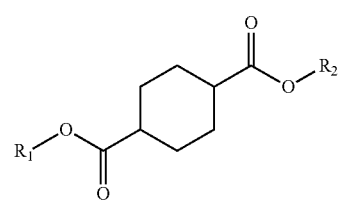

[Chemical Formula 1]

wherein $R_1$ and $R_2$ are independently the same or different, and are C4 to C12 alkyl groups,

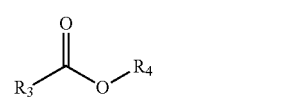

[Chemical Formula 2]

wherein $R_3$ is a C8 to C20 alkyl group containing one or more epoxy groups, and $R_4$ is a C4 to C10 alkyl group.

2. The plasticizer composition of claim 1, wherein each of $R_1$ and $R_2$ in Chemical Formula 1 is independently selected from the group consisting of a butyl group, an isobutyl group, a pentyl group, a hexyl group, a heptyl group, a 2-ethylhexyl group, an octyl group, a nonyl group, an isononyl group, a 2-propylheptyl group, a decyl group, and an isodecyl group.

3. The plasticizer composition of claim 1, wherein the cyclohexane 1,4-diester-based material is one type of a compound represented by Chemical Formula 1, and $R_1$ and $R_2$ are the same.

4. The plasticizer composition of claim 1, wherein the cyclohexane 1,4-diester-based material is a mixture including three types of compounds represented by Chemical Formula 1, and the mixture includes one type of a compound having $R_1$ and $R_2$ different from each other.

5. The plasticizer composition of claim 1, wherein $R_4$ in Chemical Formula 2 is a C4 to C8 alkyl group.

6. The plasticizer composition of claim 1, wherein $R_4$ in Chemical Formula 2 is selected from the group consisting of a butyl group, an isobutyl group, a 2-ethylhexyl group, an octyl group, an isononyl group, and a 2-propylheptyl group.

7. The plasticizer composition of claim 1, wherein the epoxidized alkyl ester-based material has an iodine value (I.V.) of less than 3.5 I$_2$g/100 g.

8. The plasticizer composition of claim 1, further comprising an epoxidized oil,
   wherein the epoxidized oil is comprised in an amount of 1 to 100 parts by weight with respect to 100 parts by weight of a total mixed weight of the epoxidized alkyl ester-based material and the cyclohexane 1,4-diester-based material.

9. A resin composition comprising:
   100 parts by weight of a resin; and
   5 to 150 parts by weight of the plasticizer composition of claim 1.

10. The resin composition of claim 9, wherein the resin is one or more selected from the group consisting of ethylene vinyl acetate, polyethylene, polypropylene, polyketone, polyvinyl chloride, polystyrene, and polyurethane.

11. The plasticizer composition of claim 3, wherein the one type of a compound represented by Chemical Formula 1 is selected from the group consisting of dibutyl cyclohexane-1,4-diester (1,4-DBCH), diisononyl cyclohexane-1,4-diester (1,4-DINCH), di(2-ethylhexyl) cyclohexane-1,4-diester (1,4-DEHCH), and di(2-propylheptyl) cyclohexane-1,4-diester(1,4-DPHCH).

12. The plasticizer composition of claim 4, wherein the mixture including three types of compounds represented by Chemical Formula 1 comprises at least one compound selected from the group consisting of butyl (2-ethylhexyl) cyclohexane-1,4-diester (1,4-BEHCH), (2-ethylhexyl) isononyl cyclohexane-1,4-diester (1,4-EINCH), butyl isononyl cyclohexane-1,4-diester (1,4-BINCH), (2-ethylhexyl) (2-propylheptyl) cyclohexane-1,4-diester (1,4-EPHCH), (2-propylheptyl) isononyl cyclohexane-1,4-diester (1,4-PINCH), and butyl (2-propylheptyl) cyclohexane-1,4-diester (1,4-BPHCH).

* * * * *